US006835432B2

United States Patent
Abe et al.

(10) Patent No.: US 6,835,432 B2
(45) Date of Patent: Dec. 28, 2004

(54) OPTICAL DISC AND METHOD FOR MANUFACTURING THE OPTICAL DISC

(75) Inventors: Shinya Abe, Kadoma (JP); Kazuhiro Hayashi, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 495 days.

(21) Appl. No.: 09/963,233

(22) Filed: Sep. 25, 2001

(65) Prior Publication Data

US 2002/0039346 A1 Apr. 4, 2002

(30) Foreign Application Priority Data

Sep. 29, 2000 (JP) ........................................ 2000-300053
Jul. 25, 2001 (JP) ........................................ 2000-225009

(51) Int. Cl.[7] ................................................ B32B 3/02
(52) U.S. Cl. ..................... 428/64.1; 428/64.4; 428/64.8; 430/270.14
(58) Field of Search .............................. 428/64.1, 64.4, 428/64.8, 945; 369/283, 275.4; 430/270.14, 495.1, 945

(56) References Cited

U.S. PATENT DOCUMENTS

| 5,236,755 A | * | 8/1993 | Howe et al. ................ 428/64.4 |
| 5,478,623 A | | 12/1995 | Iwasaki et al. |
| 5,573,831 A | | 11/1996 | Suzuki et al. |
| 5,904,969 A | * | 5/1999 | Kamezaki et al. ......... 428/64.1 |
| 5,972,459 A | | 10/1999 | Kawakubo et al. |
| 6,246,656 B1 | | 6/2001 | Kawakubo et al. |
| 2002/0034155 A1 | * | 3/2002 | Usami ....................... 369/286 |
| 2003/0003261 A1 | * | 1/2003 | Saito et al. ................ 428/64.4 |

FOREIGN PATENT DOCUMENTS

JP 04-286734 A 10/1992

* cited by examiner

*Primary Examiner*—Elizabeth Mulvaney
(74) *Attorney, Agent, or Firm*—Akin Gump Strauss Hauer & Feld, L.L.P.

(57) ABSTRACT

An optical disc comprises a first base plate having a surface in which a recess is formed and a multi-layer structure disposed over the surface. The multi-layer structure includes a reflection layer, a recording layer, and a transparent member. The reflection layer is disposed on the surface of the first base plate. The recording layer is formed on the reflection layer for substantially filling an inside of the recess. The transparent member is disposed for covering the recording layer, and is capable of transmitting writing/reading radiation.

29 Claims, 6 Drawing Sheets

(a) FILM THICKNESS: 7nm

100nm (b) FILM THICKNESS: 22nm (c) FILM THICKNESS: 55nm

OPTICAL DISC AND METHOD FOR MANUFACTURING THE OPTICAL DISC

BACKGROUND OF THE INVENTION

The present invention relates to an optical recording medium such as an optical disc, and a method for manufacturing the optical recording medium. More particularly, the present invention relates to a write-once type optical disc on which data can be recorded using an organic dye, or the like.

Compact Discs (CD) have achieved widespread use, and optical discs have already won a position as important recording media. In addition to a CD of read-only type, the widespread use of a CD-R as a disc of write-once type on which information can be recorded is remarkable. In recent years, research and development on high-density optical discs are intensively performed, and a DVD of higher density than that of a CD is proposed and practically used. Among the standards of the DVD, a DVD-R which is a write-once type optical disc is expected as a medium which is relatively inexpensive and on which information can be recorded. In addition, development on higher-density optical discs for recording signals with further higher density for high-definition TV in the future or the like which require a large capacity is pursued.

Conventionally, the write-once type optical disc, typified by CD-R, mainly uses a recording material including an organic dye as a primary component. In the case of DVD-R, substantially the same recording material is used.

Hereinafter a conventional configuration of a write-once type optical disc will be described by using an example of DVD-R.

FIG. 2 illustrates a sectional configuration of a conventional DVD-R disc. The shown DVD-R disc has a configuration in which a first base plate 201 and a second base plate 204 are bonded together by means of an adhesion layer 205. In the first base plate 201, a guide tracking groove 201a is formed in a first surface 201c, and a second surface 201d is a mirror face. FIG. 2 illustrates a plurality of cross sections of a single spiral form of the groove 201a. The first base plate 201 is formed by injection molding. The shape of the first surface 201c is transferred from a stamper.

On the first surface 201c of the first base plate 201, a recording layer 202 containing an organic dye, and a reflection layer 203 are stacked. The recording layer 202 is applied by spin coating, and the reflection layer 203 is deposited on the recording layer 202 by a method such as sputtering. The inside of the groove 201a of the first base plate 201 is filled with the applied recording layer 202, so that a surface of the recording layer 202 is substantially flat, regardless of the unevenness of the first surface 201c of the underlying recording layer 202. Accordingly, a surface of the reflection layer 203 deposited on the recording layer 202 is substantially flat.

The second base plate 204 is formed by injection molding, similarly to the first base plate 201. The second base plate 204 is bonded, via an adhesion layer 205, to the first base plate 201 in which the recording layer 202 and the reflection layer 203 are stacked.

Writing/reading radiation or light is converged by an objective 206 on an optical head, and is applied onto an optical disc from the side of the second surface 201d of the first base plate 201. More specifically, the groove 201a is irradiated with the writing/reading radiation that is transmitted through the first base plate 201.

Next, with reference to FIG. 3, another example of an optical disc will be described.

The optical disc of FIG. 3 includes an organic dye type recording layer 302 formed by deposition instead of spin coating. In the optical disc, since the recording layer 302 is deposited, a surface of the recording layer 302 has a shape reflecting a shape of a groove or a pit formed on a first surface 301c of a first base plate 301. The shape is reflected in a surface of a reflection layer 303. To the optical disc, writing/reading radiation is applied from the side of a second surface 301d of the first base plate 301.

In both of the above-described optical discs, tracking control is performed so that the writing/reading radiation tracks the groove. Usually, the detection of the tracking deviation is performed by a push-pull method. In the push-pull method, reflected radiation from a disc is converged on two detectors divided along a line which is parallel to a groove direction, and a difference in intensities of radiation detected by the right and left detectors is detected as a tracking signal. Due to a phase difference between reflected radiation from a groove and reflected radiation from a land between grooves, the signal is zero when a converged radiation beam spot of the writing/reading radiation is in a center position of the groove or the land. When the converged radiation beam spot is positioned between the center of the groove and the center of the land, the signal is a positive value or a negative value. When a wavelength of the writing/reading radiation is $\lambda$, and k is 0 or a natural number, an amplitude of the tracking signal is the maximum in a condition where an absolute value (unit: radian) of a phase difference between reflected radiation from a groove and a land is $\pi(2k+1)/2$.

In the conventional optical disc shown in FIG. 2, the recording layer 202 is formed by spin coating, so that there is an advantage that the period of time required for the step of forming the recording layer 202 can be shortened. However, since the surface of the reflection layer 203 is formed so as to be substantially flat, the following drawback arises. That is, a phase difference $\delta$ of reflected radiation through a groove portion and reflected radiation through a land portion is represented by an equation of $\delta = 4\pi \times ((n1-n2) \times d1 + n2 \times d2)/\lambda$, when a diffraction index of the first base plate 201 is n1, a diffraction index of the recording layer 202 is n2, a depth of a groove is d1, and a surface step of the recording layer 202 between a groove portion and a non-groove portion is d2.

When d2 is small and a difference between the diffraction index n1 of the first base plate 201 and the diffraction index n2 of the recording layer 202 is small, in order to obtain a sufficient amplitude of the tracking signal, it is necessary to increase the groove depth d1 for generating a phase difference. As a result, for the purpose of transferring a deep groove or pit, the period of time is elongated because a temperature of resin and mold is set high when the base plate is formed by injection molding. In addition, it is difficult for the molded base plate to be released from the stamper, and a mold release non-uniformity and a cloud may easily occur. Thus, it is difficult to improve the productivity.

In the case of the optical disc of FIG. 3, the recording layer 302 is formed by deposition, so that the reflection layer 303 is formed in accordance with the shape of the groove of the base plate 301. As a result, the phase difference $\delta$ is represented by an equation of $\delta = 4\pi \times n1 \times d1/\lambda$. Thus, a sufficient phase difference can be attained, and a good tracking signal amplitude can be obtained without increasing the groove depth d1.

However, the formation of a film by depositing a recording material containing an organic dye is slow, and it is difficult to improve the productivity.

Moreover, in both of the optical discs, since the writing/reading radiation is applied through the base plate in which grooves or pits are formed, it is important to fabricate the base plates 201 and 301 in which grooves or pits are formed with high precision and good reproducibility. The thickness of the respective base plates 201 and 301 affects the recording density. Generally, in order to improve the recording density of an optical disc, it is necessary to reduce a beam spot diameter of laser radiation used for writing/reading. For this purpose, it is necessary to shorten the wavelength of the laser radiation and to adopt an optical system having a high NA (Numerical Aperture) value. However, when the NA value is large, an aberration due to tilt of disc is increased, and the reproduction signal is deteriorated. In order to reduce such an aberration, it is preferred that the thickness of the respective base plates 201 and 301 be reduced. However, since the base plates 201 and 301 are formed by injection molding, it is difficult to precisely form the shapes of grooves or pits while reducing the thickness thereof. Thus, in the optical discs of FIG. 2 and FIG. 3, it is difficult to further improve the recording density.

SUMMARY OF THE INVENTION

The invention provides an optical disc in which a sufficiently good signal can be obtained even when the depth of a groove for tracking is reduced, and which is suitable for improving the recording density, and a method for fabricating the optical disc.

The optical disc of the present invention is an optical disc comprising a first base plate having a surface in which a recess is formed and a multi-layer structure disposed on the surface, wherein the multi-layer structure includes: a reflection layer disposed on the surface of the first base plate; a recording layer, formed on the reflection layer, for substantially filling an inside of the recess; and a transparent member, disposed for covering the recording layer, which is capable of transmitting writing/reading radiation.

In a preferred embodiment, a thickness of the recording layer in a bottom portion of the recess of the first base plate is 1.5 times or more as large as a thickness of the recording layer in a flat portion of the first base plate.

In a preferred embodiment, a top surface of the recording layer is substantially flattened, whereby a step in the top surface of the recording layer being smaller than a step in a top surface of the reflection layer.

In a preferred embodiment, the recording layer is formed by application.

In a preferred embodiment, the recording layer is made of a recording material containing a dye.

In a preferred embodiment, the recording layer is partially in contact with a surface of the first base plate via an opening portion existing in the reflection layer.

In a preferred embodiment, the first base plate is made of a material that reacts with a recording layer irradiated with writing radiation.

In a preferred embodiment, the reflection layer is made of a material having an island-like structure.

In a preferred embodiment, the transparent member is made of a radiation curable resin.

In a preferred embodiment, the transparent member is made of a thermosetting resin.

In a preferred embodiment, the transparent member includes: a second base plate capable of transmitting the writing/reading radiation; and an adhesion layer for bonding the second base plate to the first base plate, and the first base plate and the second base plate are bonded together via the adhesion layer.

In a preferred embodiment, the adhesion layer is made of a radiation curable resin.

In a preferred embodiment, the transparent member includes a semitransparent reflection layer and a second recording layer.

In a preferred embodiment, in the second recording layer, read only information is recorded or stored in the form of a groove and or a pit.

In a preferred embodiment, a protection film capable of transmitting the writing/reading radiation is formed between the first base plate and the adhesion layer.

In a preferred embodiment, a thickness of the transparent member is 0.3 mm or less.

In a preferred embodiment, a thickness of the first base plate is 1.0 to 1.2 mm.

In a preferred embodiment, a depth of the recess is $\lambda/(4 \times n)$ or less, when a wavelength of reading radiation is $\lambda$ and a refractive index of the recording layer is n.

The method for fabricating an optical disc of the present invention is a method comprising a step of producing a first substrate, a step of producing a second substrate, and a step of bonding the first and second substrates by an adhesive that is substantially transparent, wherein the step of producing the first substrate includes the steps of: (a) preparing a base plate provided with a surface having a recess; (b) forming a reflection layer on the surface of the base plate; and (c) substantially filling an inside of the recess with a recording layer.

In a preferred embodiment, a thickness of the recording layer in a bottom portion of the recess of the base plate is 1.5 times or more as large as a thickness of the recording layer in a flat portion of the base plate.

In a preferred embodiment, the step (c) includes a step of applying the recording layer on the reflection layer by spin coating.

In a preferred embodiment, the step of producing the second substrate includes: a step of forming a pit and or a groove on one side of a base plate that is substantially transparent; and a step of forming a semitransparent film.

In a preferred embodiment, a radiation curable resin is used as the adhesive that is substantially transparent.

In a preferred embodiment, after the application step, a protection film is formed on the recording layer, and a bonding step is performed.

The method for fabricating an optical disc of the present invention is a method comprising the steps of: (a) preparing a base plate provided with a surface having a recess; (b) forming a reflection layer on the surface of the base plate; (c) substantially filling an inside of the recess with a recording layer; (d) applying a material that is substantially transparent; and (e) curing the substantially transparent material.

In a preferred embodiment, a thickness of the recording layer in a bottom portion of the recess formed in a surface of the reflection layer is 1.5 times or more as large as a thickness of the recording layer in a flat portion of the surface of the reflection layer.

In a preferred embodiment, the step (c) includes a step of applying the recording layer on the reflection layer by spin coating.

In a preferred embodiment, the method further includes after the application step and before the step of applying the substantially transparent material: a step of forming information layer in which information is recorded in the form of a pit or a groove; and a step of forming a semitransparent reflection layer.

In a preferred embodiment, the application of the substantially transparent material is performed by spin coating.

In a preferred embodiment, the substantially transparent material is made of a radiation curable resin, and the substantially transparent material is irradiated with radiation in the step of curing the substantially transparent material.

BRIEF DESCRIPTION OF THE SEVERAL VIEWS OF THE DRAWINGS

The foregoing summary as well as the following detailed description of the preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Hereinafter, preferred embodiments of the inventive optical disc will be described with reference to the accompanying drawings.

(Embodiment 1)

Figure 1A:
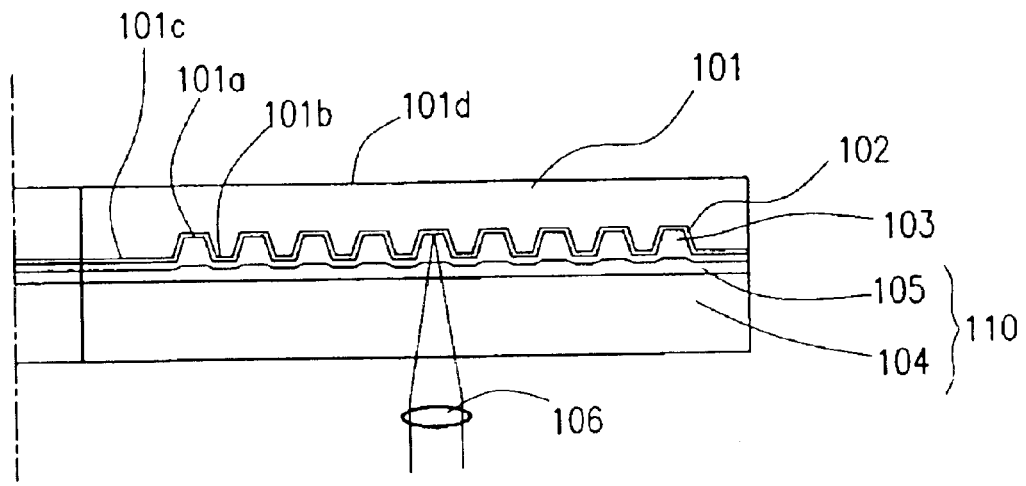
FIG. 1A is a cross-sectional view illustrating a first embodiment of an optical disc according to the present invention.

FIG. 1A is a cross-sectional view illustrating a first embodiment of an optical disc according to the present invention. FIG. 1A only shows a portion on the right side of a rotation center axis (indicated by one dot chain line) of the optical disc.

The optical disc of this embodiment includes a first base plate 101 having a first surface 101c in which a spiral or concentric tracking groove (recess) 101a for guide tracking control is formed, and a multi-layer structure disposed on the first surface 101c of the first base plate 101. In the example shown in the figure, a groove is formed in the first surface 101c of the first base plate 101, but a second surface (a face opposite to the first surface) 101d is flat. In the first surface 101c, instead of the groove, a pit may be formed.

The first base plate 101 is a disk-like substrate formed by injection molding from a polycarbonate material. The groove 101a of the first base plate 101 is transferred from a stamper in the injection molding.

Since it is unnecessary for the first base plate 101 to transmit writing/reading radiation, the first base plate 101 is not necessarily transparent. Even in the case where an optical disc apparatus adopts an optical system having a high NA value (0.8 or more, for example), it is unnecessary to reduce the thickness of the first base plate 101. The thickness of the first base plate 101 in this embodiment is arbitrarily selected, e.g., 0.6 to 1.2 mm.

The multi-layer structure comprises a reflection layer 102, a recording layer (or a rewritable information layer) 103 formed on the reflection layer 102, and a transparent member 110 disposed so as to cover the recording layer 103.

The reflection layer 102 is formed of a metal. The thickness of the reflection layer 102 is 5 to 60 nm, for example, and is substantially uniform in the inside or the outside of the groove 101a. The reflection layer 102 in the section of the optical disc has a shape reflecting the uneven shape of the first surface 101c of the first base plate 101. As described below in detail, the reflection layer 102 is not necessarily made of a film that is uniform and perfectly continuous. In a preferred embodiment, the reflection layer 102 is made of an aggregate of metal, and may be porous.

The recording layer 103 is configured by a film of a recording material having an organic dye, and is formed so as to substantially fill the inside of the groove 101a of the first base plate 101. The recording material is, for example, a material having a cyanine dye or a dye of phthalocyanine type. When the recording layer 103 is applied onto the first surface 101c of the first base plate 101 by a method such as spin coating, the recording layer 103 is formed so as to substantially fill the inside of the groove 101a. In addition, the recording layer 103 is also formed thinly on a portion (a flat portion) 101b between grooves. Preferably, the thickness of the recording layer 103 in the flat portion 101b is as thin as possible.

Figure 1B:
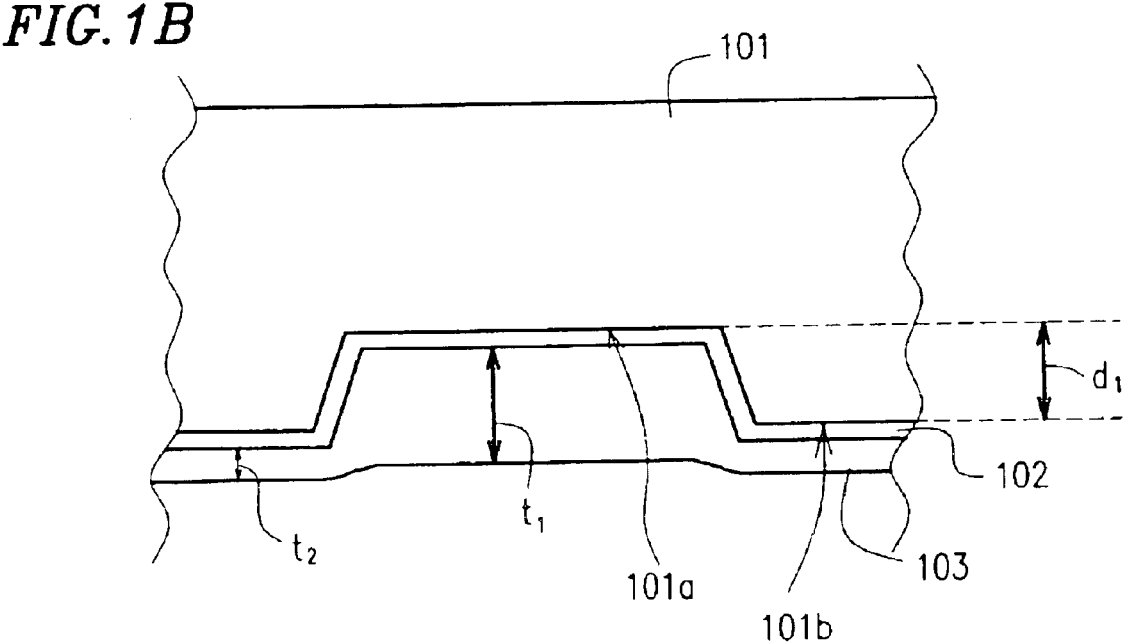
FIG. 1B is an enlarged view illustrating a tracking groove of the optical disc according to the first embodiment of the present invention.

FIG. 1B is an enlarged view illustrating the section of the recording layer 103 in more detail. In FIG. 1B, the thickness of the recording layer 103 in the groove 101a is represented by "t1", and the thickness thereof in the flat portion 101b is represented by "t2". In this embodiment, since the inside of the groove 101a is substantially filled with the recording layer 103, the thickness t1 is 1.5 times as large as the thickness t2. For example, when the depth d1 of the groove is about 32 nm, t1 is about 40 nm, and t2 is about 10 nm. The actual groove width is about 0.1 to 0.3 µm, so that the relationship between the groove depth and the groove width shown in the respective figures of this specification does not actually represent the actual relationship.

Referring to FIG. 1A again, the transparent member 110 is made of a transparent material that can transmit writing/reading radiation. In the example shown in FIG. 1A, the transparent member 110 is configured by a transparent base plate 104 and a transparent adhesion layer 105. The transparent adhesion layer 105 bonds the transparent base plate 104 to the first base plate 101, so as to stick the base plates together. The transparent adhesion layer 105 is not limited to one layer. Alternatively, the transparent adhesion layer 105 may have a multi-layer structure if it is a transparent medium. Instead of the transparent base plate 104 which is formed by injection molding or other methods, a radiation curable resin layer my be formed thick on the base plate 101, thereby constituting the transparent member 110.

The thickness of the transparent adhesion layer 105 is about 5 to 50 µm, for example. The thickness of the transparent base plate 104 is about 0.1 to 0.3 mm, for example. In view of these numerical values, it is seen that the depth and the width of the groove 101a shown in FIG. 1A are exaggerated in size with respect to the sizes of the other composing elements.

In the case where a user records information onto the optical disc of this embodiment, writing radiation is applied to the recording layer 103 via an objective 106 of an optical disc apparatus. The writing radiation applies thermal energy to the recording layer 103, so that optical properties (radiation absorptance by organic dye, for example) of the recording layer 103 are changed. On the other hand, in the case where a user reads the information recorded or stored on the optical disc, reading radiation is applied to the recording layer 103 via the objective 106 of the optical disc apparatus. The reading radiation with smaller optical output power than that of the writing radiation is used for detecting a difference in optical properties varied depending on positions of the recording layer 103. By detecting reflectance of the reading radiation, the information can be read.

In the optical disc of this embodiment, when the writing/reading radiation is applied to the recording layer 103, the writing/reading radiation is applied to the recording layer 103 not via the first base plate 101 in which grooves or pits are formed in the surface thereof but via the transparent base plate 104 bonded to the first base plate 101.

Figure 2:
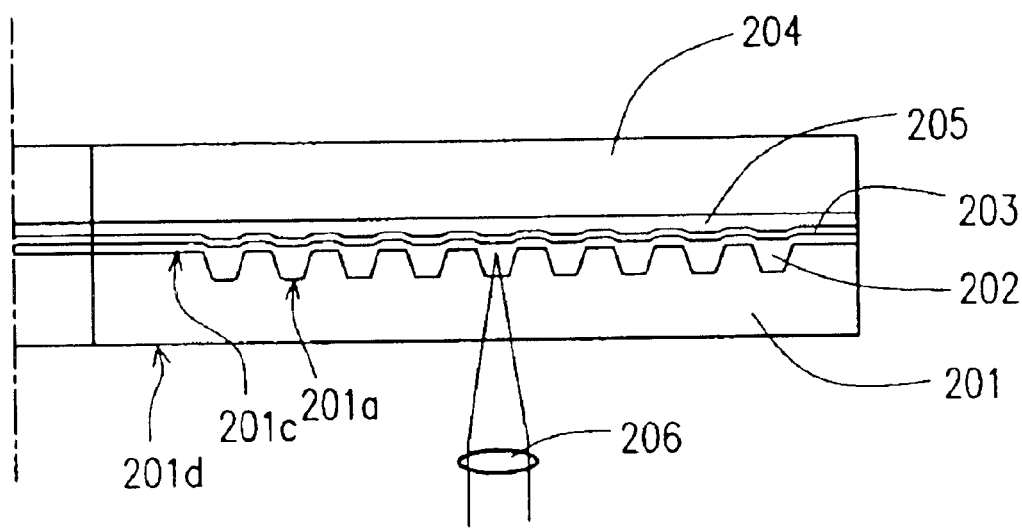
FIG. 2 is a cross-sectional view illustrating a configuration of a conventional optical disc.
Figure 3:
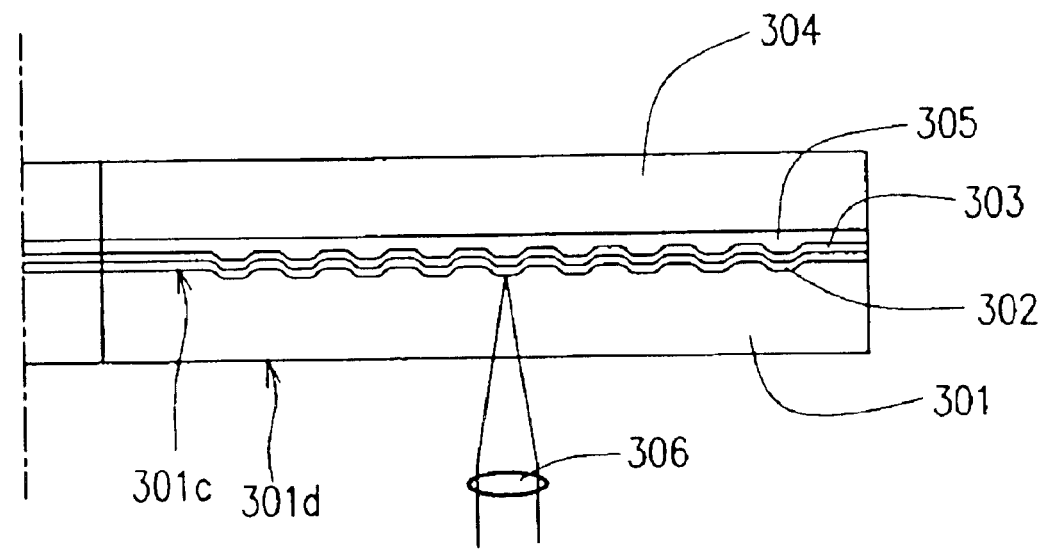
FIG. 3 is a cross-sectional view illustrating a configuration of another conventional optical disc.

A "groove" and a "land" of the optical disc are usually defined by relative placement with respect to an optical head (an objective) in writing/reading. In the optical disc of FIG. 1A, a portion that is relatively closer to the objective 106 is referred to as a "groove", and a portion that is relatively farther from the objective 106 is referred to as a "land". Specifically, in the optical disc of FIG. 1A, as compared with the optical discs of FIG. 2 and FIG. 3, the groove and the land are inverted. With such a definition, the optical disc of this embodiment is an optical disc of so-called "land recording type". However, in this specification, in the interests of simplicity, a recess that should be strictly referred to as a "land" is also referred to as a groove. In order to avoid confusion, the groove 101a that is filled with the recording layer 103 is sometimes referred to as a "recess".

The depth d1 of the groove 101a of the first base plate 101 is the best in the condition of $d1=\lambda/(8 \times n2)$, when the wavelength of the writing/reading radiation is $\lambda$, and the refractive index of the recording layer 103 is n2. Specifically, for red laser having a wavelength of 650 nm, a sufficient push-pull tracking signal can be obtained in a condition where d1 is substantially equal to 50 nm. For blue laser having a wavelength of 405 nm, a sufficient push-pull-tracking signal can be obtained in a condition where d1 is substantially equal to 35 nm.

Not only from the view of the properties of tracking signals, it is necessary to set the depth d1 of the groove so as to obtain recording signals with good quality in reproducing. Thus, it is desired that the depth d1 is set to be deeper than the above-mentioned value. However, the push-pull tracking signal is the minimum in the condition of $d1=\lambda/(4 \times n2)$, so that it is desired that d1 is set to be shallower than $\lambda/(4 \times n2)$.

In this embodiment, when information is recorded onto the recording layer 103, the properties of the recording layer 103 which receives optical energy is altered due to the chemical reaction with the material of the base plate 101. In order to cause such chemical reaction, instead of the existence of the reflection layer 102 as a uniform film, it is preferred that opening portions are partially formed in the reflection layer 102, and the base plate 101l and the recording layer 103 are in contact with each other via the opening portions. In this embodiment, the reflection layer 102 having an island-like structure is formed. The reflection layer 102 having such an island-like structure is obtained in the case where a metal film is thinly grown by using a thin film deposition technique such as vapor deposition. However, if the metal film is too thin, it is not preferred because the reflectance of the writing/reading radiation falls short of a desired level, and the intensity of the reading radiation is lowered. A preferred average thickness of the reflection layer 102 is 5 to 40 nm.

Figure 7:
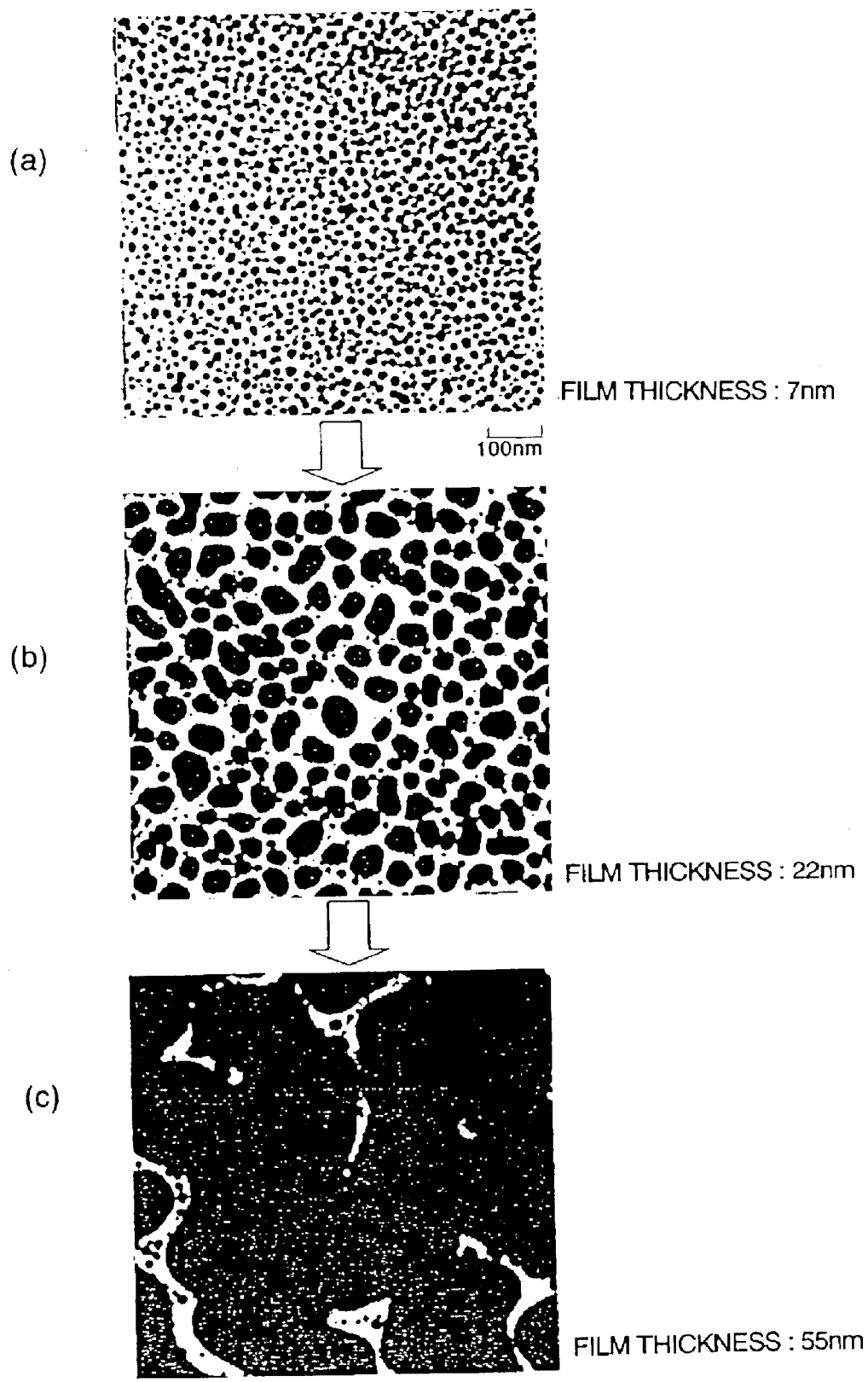
FIG. 7 is a plan view including (a) to (c) showing an island-like structure of a reflection layer of the optical disc according to the present invention.

In FIG. 7, (a) to (c) show morphology during growing steps of an Au layer formed by vapor deposition, and (a) to (c) are plan views produced based on the observation by a transmission electron microscope photograph. As shown in (a) to (c) of FIG. 7, when the metal layer is thin (25 nm or less, for example), the metal layer is not uniform, and has an island-like structure in which metal particles or precipitates are aggregated. As the thickness of the metal layer is increased, the size of each metal particle is increased, and adjacent metal particles are coupled to each other. The metal particles eventually constitute a continuous uniform film (see (c) of FIG. 7).

Even in the case where the reflection layer 102 is made of a metal layer having the above-mentioned island-like structure, if the average thickness of the reflection layer 102 is regulated in an appropriate range, it is possible to obtain a desired reflectance. In this embodiment, a metal of such an island-like structure is also referred to as a "metal layer" or a "reflection layer"

In this embodiment, a reflection layer of such an island-like structure is used, so that a partial contact between the base plate 101 and the recording layer 103 is realized. Due to the partial contact, the heat generated in the irradiation of writing radiation can enhance the chemical reaction between the base plate 101 and the recording layer 103. There is an advantage that the chemical reaction causes the change in groove width and depth (the change in shape of the groove), so that the quality of the reproduced signal is improved.

When the reflection layer 102 has the island-like structure, the structure of the reflection layer 102 is changed by the heat generated in the irradiation of the writing radiation, so that the reflectance in the irradiated portion of the reflection layer 102 is changed. As a result, in the incident portion of the writing radiation, not only a mark is formed in the recording layer 103, but also the change in reflectance by the reflection layer 102 is expected. This contributes to the improvement of detection sensitivity of a recording mark.

In this embodiment, Au is used for the material of the reflection layer 102. Alternatively, another metal or an alloy can be used. For example, a silver alloy such as AgPdCu, a metal such as Al, Ti, Cr, or an alloy of these metals can be used for the material of the reflection layer.

In this embodiment, transparent polycarbonate is used for the material of the base plate 101. However, the base plate 101 is not necessarily required to transmit the reading radiation. For this reason, an opaque material can be used for forming the base plate 101, if desired grooves or pits can be easily formed in the opaque material. On the other hand, for the transparent base plate 104 positioned on the incident side of the writing/reading radiation, a material other than polycarbonate can be used if the material can transmit the writing/reading radiation.

In this embodiment, a radiation curable resin is used for the transparent adhesion layer 105. Alternatively, a thermosetting resin, or another resin can be used if the material deteriorates the properties of the recording layer 103.

Next, with reference to FIG. 4, a method for manufacturing the optical disc of this embodiment will be described.

Figure 4:
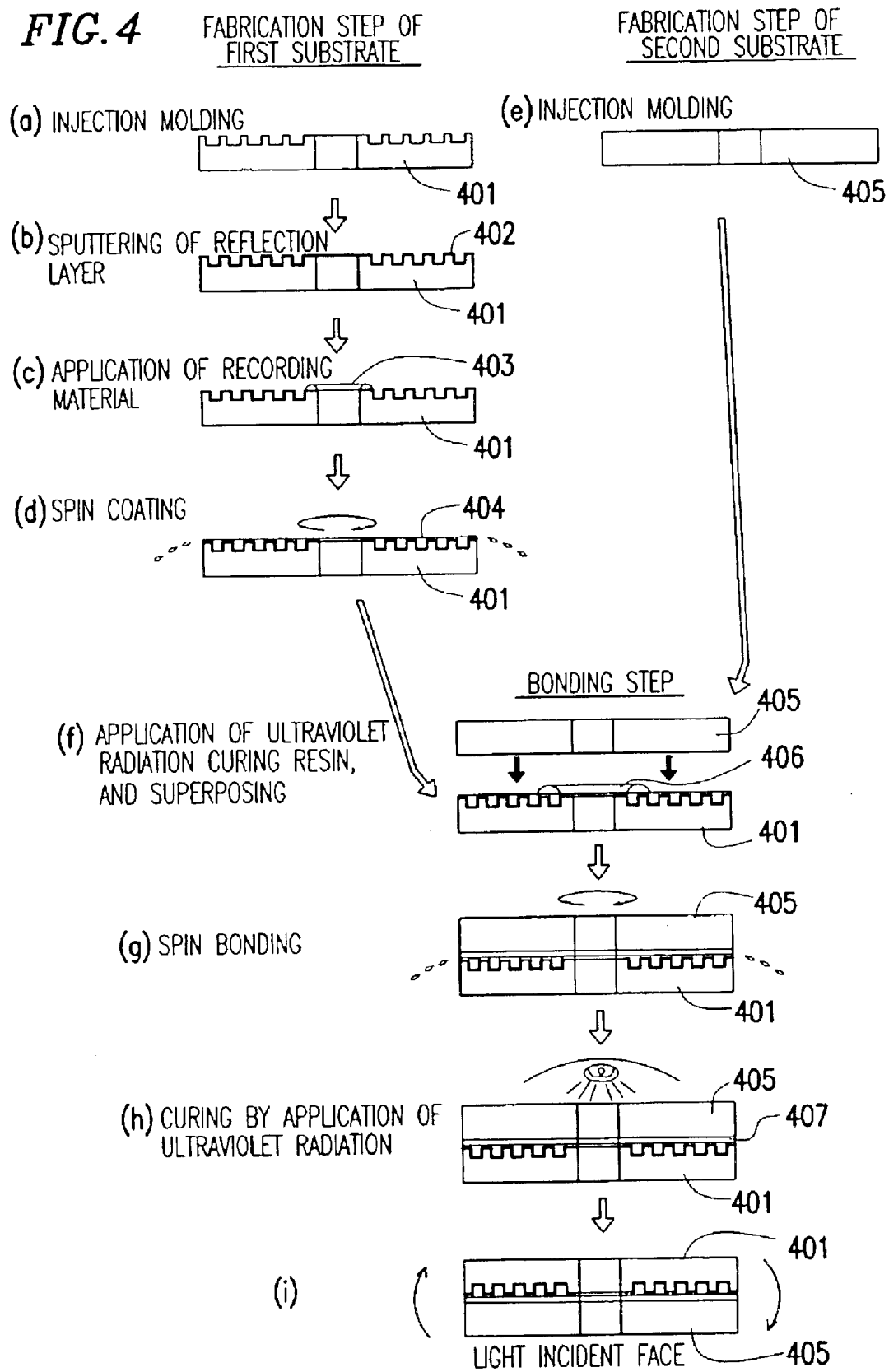
FIG. 4 is a hart including (a) to (i) which illustrate fabrication steps of the optical disc according to the first embodiment of the invention.

A stamper that defines a shape of grooves or pits is used, and a disk-like base plate 401 is formed by injection molding ((a) of FIG. 4). Thereafter, on a surface of the base plate 401 onto which the grooves or pits are transferred, a thin metal film is deposited by sputtering, thereby forming a reflection layer 402 ((b) of FIG. 4). As shown in (c) of FIG. 4, after a recording material 403 is dispensed to an inner circumference portion of the base plate 401, the base plate 401 is rotated at a high speed (300 to 2000 rpm, for example), thereby forming a recording layer 404 ((d) of FIG. 4). The applied recording layer 404 fills the inside of the grooves formed on the surface of the base plate 401, so that the surface of the recording layer 404 is substantially flat.

A first substrate is fabricated in the above-mentioned steps.

On the other hand, as shown in (e) of FIG. 4, a second substrate (a second base plate) 405 having at least one mirror face is produced by injection molding. At this time, the thickness of the second base plate 405 is preferably thin because the thickness reduces the aberration of the reading radiation. It is preferred that the thickness of the second base plate 405 is set to be 0.3 mm or less (0.1 mm, for example). Such a thin second base plate 405 having the thickness of 0.3 mm or less can be easily formed by a method other than the injection molding. For example, the second base plate 405 can be made of a transparent sheet having a desired thickness of 0.3 mm or less.

A preferable thickness of the second base plate 405 is varied depending on a NA value of an optical system employed in an optical disc apparatus. In the case where the wavelength of the writing/reading radiation is about 405 nm, for example, and the NA value of the optical system is about 0.85, it is preferred that the thickness of the second base plate 405 is set to be 0.2 mm or less, in terms of reducing the aberration caused by the inclination of a disc. More preferably, the thickness is set to be about 0.1 mm. In this embodiment, since any grooves or pits are not formed in the second base plate 405, the second base plate 405 can be produced with high precision by injection molding, or other methods.

As shown in (f) of FIG. 4, after acrylic type radiation curable resin as a radiation curable resin 406 is dispensed to an inner circumference portion of a surface of the first substrate in which the recording layer 404 is formed, the second substrate 405 is superposed on the radiation curable resin 406. At this time, if one of the surfaces of the second substrate 405 is not a mirror face, the super-position is performed so that the non-mirror face is opposed to the first substrate.

Thereafter, as shown in (g) of FIG. 4, the first base plate 401 is rotated at a high speed, thereby forming a uniform layer of the radiation curable resin 406. Next, as shown in (h) of FIG. 4, the radiation curable resin 406 is cured by means of an ultraviolet lamp, thereby forming a transparent adhesion layer 407. Accordingly, as shown in (i) of FIG. 4, an optical disc on and from which information can be recorded and reproduced from the side of the second base plate 405 is fabricated.

When the second base plate 405 is produced, an information recording layer (a read only information layer) to which pits and the like are transferred can be formed on one face of the second base plate 405. In this case, if a semi-transparent reflection layer of AgPdCu alloy or the like is disposed, an optical disc of dual-layer type having two recording layers, i.e., a write-once type information recording layer and a read only information layer can be obtained.

Alternatively, after a radiation curable resin is uniformly applied by spin coating or the like on the first substrate in which the recording layer 404 is formed, the resin is cured by the irradiation of ultraviolet radiation, thereby forming a protection layer. Then, the first substrate is bonded to the second base plate 405. If such a protection layer is thickly formed, a desired optical disc can be obtained without sticking the second base plate 405.

(Embodiment 2)

Figure 5:
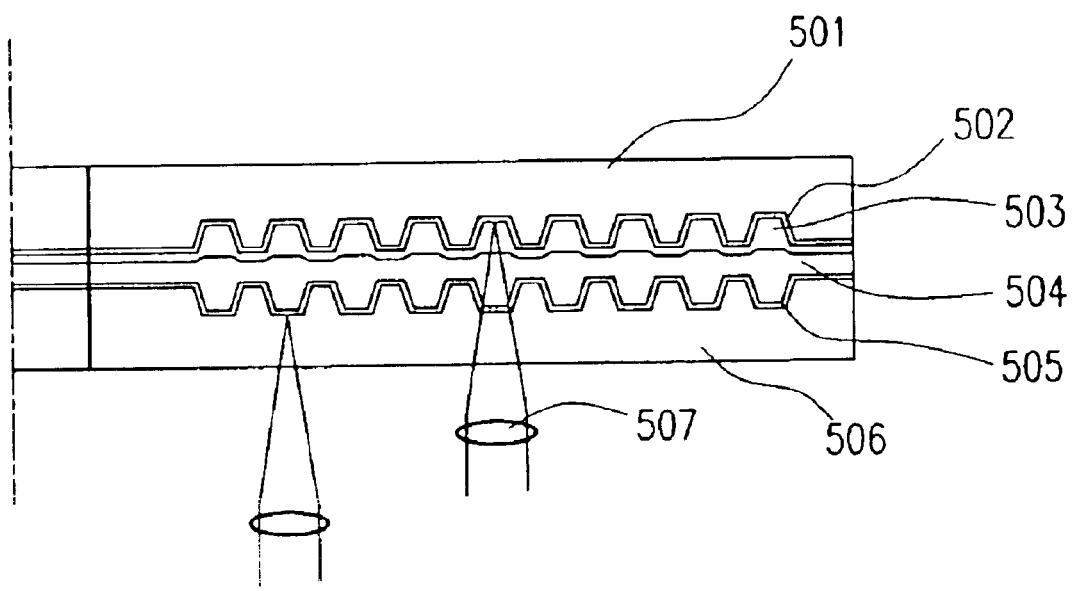
FIG. 5 is a cross-sectional view illustrating a second embodiment of the optical disc according to the present invention.

With reference to FIG. 5, an optical disc in a second embodiment of the present invention will be described.

The optical disc in this embodiment comprises a first base plate 501 having a first surface in which a groove is formed, and a multi-layer structure disposed on the first surface of the first base plate 501. In the shown example, any groove or pit is not formed in a second surface (a face on the opposite side of the first surface) of the first base plate 501.

The first base plate 501 is a disk-like substrate made of a polycarbonate material by injection molding. It is unnecessary for the first base plate 501 to be transparent.

The multi-layer structure includes a reflection layer 502, a recording layer 503 formed on the reflection layer 502, and a transparent member disposed so as to cover the recording layer 503. The base plate 501, the reflection layer 502, and the recording layer 503 have the same configurations as those of the base plate 101, the reflection layer 102, and the recording layer 103 in the above-described first embodiment.

The transparent member in this embodiment is made of a transparent material that can transmit writing/reading radiation. In the example of FIG. 5, the transparent member has a multi-layer structure including a radiation curable resin layer 504, a semitransparent reflection layer 505 in which information is recorded in the form of pits, and a transparent cover layer 506 for passing the writing/reading radiation therethrough. For example, the thickness of the radiation curable resin layer 504 is 10 to 30 $\mu$m, the thickness of the semitransparent reflection layer 505 is 5 to 20 $\mu$m, and the thickness of the transparent cover layer 506 is 0.1 to 0.2 mm. In order to improve the reading precision in reproduction, the transparent cover layer 506 is preferably as thin as possible.

With the above-described configuration, information can be written once in the recording layer 503 via an objective 507. In addition, read only information in the semitransparent reflection layer 505 and information recorded in the recording layer 503 can be reproduced.

The radiation curable resin layer 504 and the transparent cover layer 506 may be formed from a resin other than the radiation curable resin, if the material resin is transparent to the writing/reading radiation. Alternatively, the layer can be a multi-layer film.

Next, with reference to FIG. 6, a method for fabricating the optical disc of this embodiment will be described.

Figure 6:
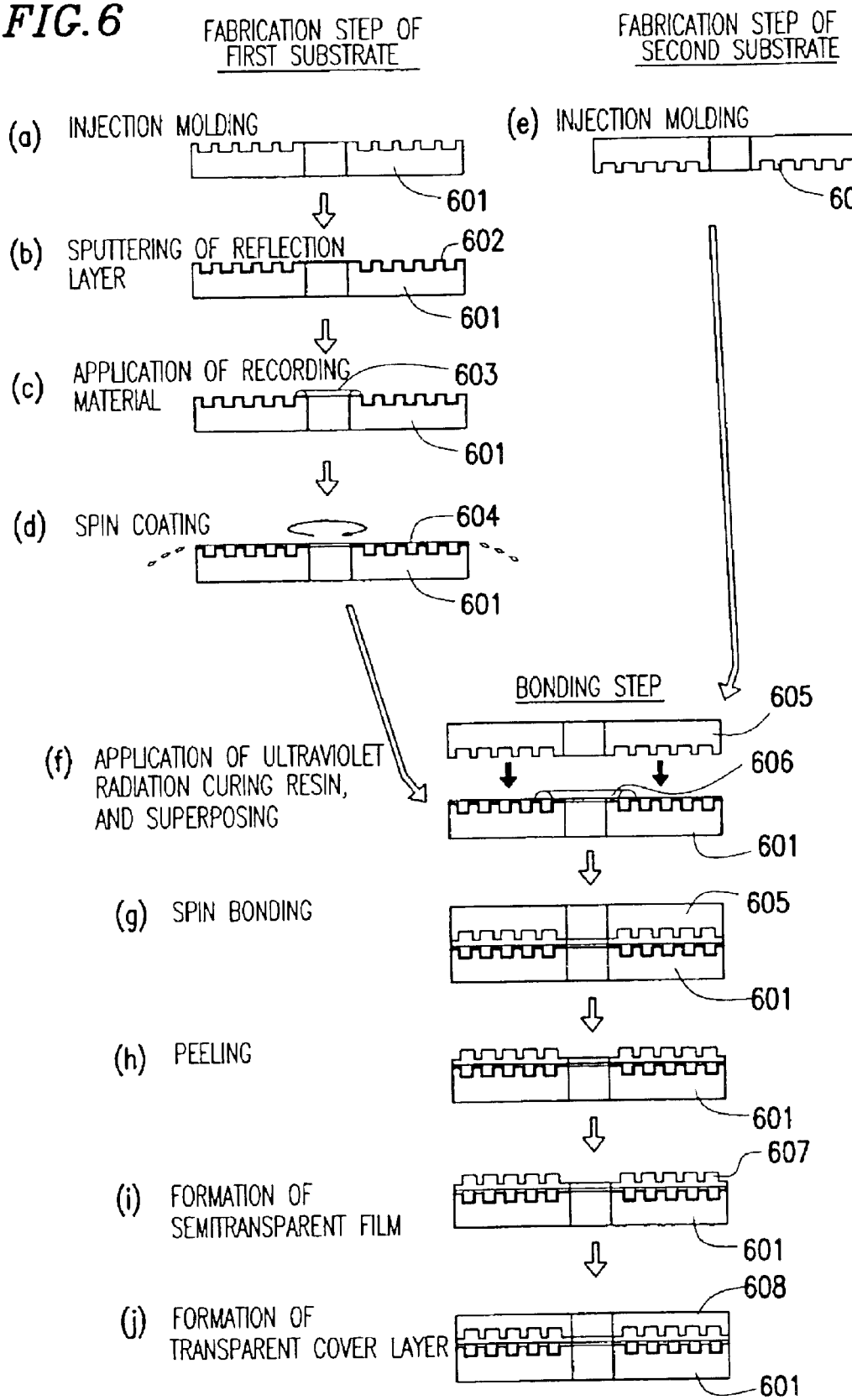
FIG. 6 is a chart including (a) to (i) which illustrate fabrication steps of the optical disc according to the second embodiment of the invention.

First, a stamper having an uneven shape of grooves is used, so as to produce a disk-like first base plate 601 by injection molding ((a) of FIG. 6). Thereafter, on a surface of the first base plate 601 to which grooves or pits are transferred, a metal thin film is deposited by sputtering, thereby forming a reflection layer 602 ((b) of FIG. 6). As shown in (c) of FIG. 6, after a recording material 603 is dispensed to an inner circumference portion of the first base plate 601, the first base plate 601 is rotated at a high speed, thereby forming a recording layer 604 ((d) of FIG. 6).

A first substrate is fabricated in the above-mentioned steps. On the other hand, as shown in (e) of FIG. 6, a second substrate (a second base plate) 605 in which information is recorded on one surface in the form of pits is produced by injection molding. The arrangement of pits reflects read only information.

Next, as shown in (f) of FIG. 6, an acrylic type ultraviolet curable resin as a radiation curable resin 606 is dispensed to an inner circumference of the surface of the first base plate 601 on which the recording layer 604 is formed. Then, the substrates are superposed so that the surface of the second base plate 605 to which pits are transferred is opposed to the recording layer 604. After a uniform radiation curable resin layer is formed by rotating the first base plate 601 at a high speed, the layer is cured by ultraviolet lamp, thereby forming a transparent adhesion layer ((g) of FIG. 6).

Next, as shown in (h) of FIG. 6, by removing the second base plate 605, pits of the second base plate 605 are transferred to a surface of the transparent adhesion layer. In order to easily peel off the second base plate 605, it is desired that the surface of the second base plate 605 be previously coated with a material which can be easily peeled.

On the transparent adhesion layer, a semitransparent reflection layer 607 of AgPdCu alloy, for example, is formed by sputtering ((i) of FIG. 6). Then, after the radiation curable resin is applied by spin coating, the resin is cured, so as to form a transparent cover layer (thickness of 0.05 to 0.2 μm) 608 ((j) of FIG. 6). The transparent cover layer 608 may be made of a base plate which is substantially transparent such as polycarbonate. The substantially transparent base plate is bonded to the first substrate with a radiation curable resin.

Instead of the above-mentioned method, after a radiation curable resin is uniformly applied to the first substrate 601 in which the recording layer 604 is formed by spin coating or other methods, and the resin is cured by the irradiation of ultraviolet radiation, thereby forming a protection layer, the first substrate 601 may be bonded to the second base plate 605.

In the respective embodiments, the shape of the groove formed in the first base plate is not mentioned. The groove may be formed so as to wobble on a disc. In this case, based on the wobbling of the groove, a clock signal, address information, and the like can be reproduced. Since the wobble frequency is preferably set to be constant along the track groove, address information is preferably recorded by varying the pattern or specific shape of wobble.

According to the optical disc of the present invention, even in the case where a groove in a base plate for tracking is shallow, a good push-pull-tracking signal can be obtained. In addition, since the groove can be shallow and the recording density can be improved even when a base plate having a groove with an increased thickness is employed, a disc suitable for increasing the recording density can be easily fabricated.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. An optical disc comprising a first base plate having a surface in which a recess is formed and a multi-layer structure disposed on the surface, wherein the multi-layer structure includes:

a reflection layer disposed over the surface of the first base plate;

a recording layer, formed over the reflection layer, for substantially filling an inside of the recess, wherein a thickness of the recording layer in a bottom portion of the recess of the first base plate is at least 1.5 times as large as a thickness of the recording layer in a flat portion of the first base plate; and a transparent member that is capable of transmitting writing/reading radiation, said transparent member covering the recording layer.

2. The optical disc of claim 1, wherein a top surface of the recording layer is substantially planarized, and a step in the top surface of the recording layer being smaller than a step in a top surface of the reflection layer.

3. The optical disc of claim 1, wherein the recording layer is formed by spin coating.

4. The optical disc of claim 1, wherein the recording layer is made of a recording material containing a dye.

5. The optical disc of claim 1, wherein the transparent member is made of a radiation curable resin.

6. The optical disc of claim 1, wherein the transparent member is made of a thermosetting resin.

7. The optical disc of claim 1, wherein a thickness of the transparent member is 0.3 mm or less.

8. The optical disc of claim 7, wherein a thickness of the first base plate is 1.0 to 1.2 mm.

9. An optical disc comprising a first base plate having a surface in which a recess is formed and a multi-layer structure disposed on the surface, wherein the multi-layer structure includes:

a reflection layer disposed over the surface of the first base plate;

a recording layer, formed over the reflection layer, for substantially filling an inside of the recess, wherein the recording layer is partially in contact with a surface of the first base plate via opening portions existing in the reflection layer; and a transparent member that is capable of transmitting writing/reading radiation, said transparent member covering the recording layer.

10. The optical disc of claim 9, wherein the first base plate is made of a material which reacts with a recording layer irradiated with writing radiation.

11. The optical disc of claim 9, wherein the reflection layer is made of a material having an island-like structure.

12. An optical disc according to claim 9, wherein the recording layer is made of a recording material containing a dye.

13. An optical disc comprising a first base plate having a surface in which a recess is formed and a multi-layer structure disposed on the surface, wherein the multi-layer structure includes:

a reflection layer disposed over the surface of the first base plate;

a recording layer, formed over the reflection layer, for substantially filling an inside of the recess; and a transparent member that is capable of transmitting writing/reading radiation, said transparent member covering the recording layer, wherein the transparent member includes:

a second base plate capable of transmitting the writing/reading radiation; and an adhesion layer for bonding the second base plate to the first base plate, and the first base plate and the second base plate are bonded together via the adhesion layer.

14. The optical disc of claim 13, wherein the adhesion layer is made of a radiation curable resin.

15. The optical disc of claim 13, wherein the transparent member includes a semitransparent reflection layer and a second recording layer.

16. The optical disc of claim 15, wherein in the second recording layer, read only information is recorded in the form of a groove and/or a pit.

17. The optical disc of claim 13, wherein a protection film capable of transmitting the writing/reading radiation is formed between the first base plate and the adhesion layer.

18. An optical disc comprising a first base plate having a surface in which a recess is formed and a multi-layer structure disposed on the surface, wherein a depth of the recess is $\lambda/(4 \times n)$ or less, when a wavelength of reading radiation is $\lambda$ and a refractive index of the recording layer is n, and the multi-layer structure includes:

a reflection layer disposed over the surface of the first base plate;

a recording layer, formed over the reflection layer, for substantially filling an inside of the recess; and a transparent member that is capable of transmitting writing/reading radiation, said transparent member covering the recording layer.

19. A method for fabricating an optical disc comprising a step of producing a first substrate, a step of producing a second substrate, and a step of bonding the first and second substrates by an adhesive which is substantially transparent, wherein the step of producing the first substrate includes the steps of:

preparing a base plate provided with a surface having a recess;

forming a reflection layer on the surface of the base plate; and substantially filling an inside of the recess with a recording layer.

20. The method of claim 19, wherein a thickness of the recording layer in a bottom portion of the recess of the base plate is 1.5 times or more as large as a thickness of the recording layer in a flat portion of the base plate.

21. The method of claim 19, wherein the step (c) includes a step of applying the recording layer on the reflection layer by spin coating.

22. The method of claim 19, wherein the step of producing the second substrate includes:

a step of forming a pit and/or a groove on one side of a base plate which is substantially transparent; and a step of forming a semitransparent film.

23. The method of claim 19, wherein a radiation curable resin is used as the adhesive which is substantially transparent.

24. The method of claim 19, wherein after the application step, a protection film is formed on the recording layer, and a bonding step is performed.

25. A method for fabricating an optical disc comprising the steps of:

preparing a base plate provided with a surface having a recess;

forming a reflection layer on the surface of the base plate;

substantially filling an inside of the recess with a recording layer, wherein a thickness of the recording layer in a bottom portion of the recess formed in a surface of the reflection layer is at least 1.5 times as large as a thickness of the recording layer in a flat portion of the surface of the reflection layer;

applying a material which is substantially transparent; and curing the substantially transparent material.

26. The method of claim 25, wherein the step (c) includes a step of applying the recording layer on the reflection layer by spin coating.

27. A method for fabricating an optical disc comprising the steps of:

preparing a base plate provided with a surface having a recess;

forming a reflection layer on the surface of the base plate;

substantially filling an inside of the recess with a recording layer;

forming an information layer in which information is recorded in the form of a pit or a groove;

forming a semitransparent reflection layer;

applying a material which is substantially transparent; and curing the substantially transparent material.

28. The method of claim 25, wherein the application of the substantially transparent material is performed by spin coating.

29. The method of claim 25, wherein the substantially transparent material is made of a radiation curable resin, and the substantially transparent material is irradiated with radiation in the step of curing the substantially transparent material.

* * * * *

UNITED STATES PATENT AND TRADEMARK OFFICE
CERTIFICATE OF CORRECTION

PATENT NO. : 6,835,432 B2
DATED : December 28, 2004
INVENTOR(S) : Shinya Abe et al.

It is certified that error appears in the above-identified patent and that said Letters Patent is hereby corrected as shown below:

<u>Title page,</u>
Item [30], Foreign Application Priority Data, the application number of the second document should read: -- 2001-225009 --.

Signed and Sealed this

Twenty-sixth Day of April, 2005

JON W. DUDAS
*Director of the United States Patent and Trademark Office*